US012208611B2

(12) United States Patent
Wehrmann et al.

(10) Patent No.: US 12,208,611 B2
(45) Date of Patent: Jan. 28, 2025

(54) ROLL HOLDER FOR A LABEL ROLL, AND LABEL PRINTER

(71) Applicant: Bizerba SE & Co. KG, Balingen (DE)

(72) Inventors: Johann Wehrmann, Balingen (DE); Ralf Clement, Balingen (DE)

(73) Assignee: BIZERBA SE & CO. KG, Balingen (DE)

( * ) Notice: Subject to any disclaimer, the term of this patent is extended or adjusted under 35 U.S.C. 154(b) by 214 days.

(21) Appl. No.: 17/855,867

(22) Filed: Jul. 1, 2022

(65) Prior Publication Data

US 2023/0033033 A1 Feb. 2, 2023

(30) Foreign Application Priority Data

Aug. 2, 2021 (EP) .................................... 21189241

(51) Int. Cl.

| | |
|---|---|
| ***B41J 15/02*** | (2006.01) |
| ***B41J 3/407*** | (2006.01) |
| ***B41J 15/04*** | (2006.01) |

(52) U.S. Cl.

CPC ............. *B41J 15/02* (2013.01); *B41J 3/4075* (2013.01); *B41J 15/042* (2013.01); *B41J 15/046* (2013.01)

(58) Field of Classification Search

CPC ........ B41J 15/02; B41J 3/4075; B41J 15/042; B41J 15/046

See application file for complete search history.

(56) References Cited

U.S. PATENT DOCUMENTS

| | | | |
|---|---|---|---|
| 4,141,517 | A | 2/1979 | Olcer |
| 4,990,215 | A | 2/1991 | Anderson |
| 5,087,318 | A | 2/1992 | Anderson |

FOREIGN PATENT DOCUMENTS

| | | | | |
|---|---|---|---|---|
| DE | 738578 C | | 8/1943 | |
| JP | H1179480 | * | 3/1999 | .............. B41J 15/02 |

* cited by examiner

*Primary Examiner* — Geoffrey S Mruk

(74) *Attorney, Agent, or Firm* — Leydig, Voit & Mayer, Ltd.

(57) ABSTRACT

A roll holder is for a label roll of linerless labels wound in a crosswise manner. The roll holder has: a horizontally arranged spindle, which is held by a stand on at least one side, and a rotatable roll mount, which is oriented in parallel with the spindle, and which is mounted on the spindle. The roll mount is mounted on the spindle in a linearly displaceable manner using at least one linear bearing.

27 Claims, 10 Drawing Sheets

ROLL HOLDER FOR A LABEL ROLL, AND LABEL PRINTER

CROSS-REFERENCE TO PRIOR APPLICATIONS

This application claims benefit to European Patent Application No. EP 21 189 241.9, filed on Aug. 2, 2021, which is hereby incorporated by reference herein.

FIELD

The present disclosure relates to a roll holder for a label roll and to a label printer, in particular to a label printer comprising a roll holder for a label roll.

BACKGROUND

Label printers, in particular label printers for labeling food packaging, comprise a rotatable roll holder intended for carrying a label roll of a wound-up paper tape. During printing, the paper tape is unrolled and carried along a paper path to a print head. By way of example, the roll holder comprises a stop in the axial direction, which the label roll, in particular the core of the label roll, strikes when being mounted on the roll holder, such that the label roll is in a defined position in the axial direction of the roll holder. If the individual paper layers of the label roll are rolled up precisely one on top of the other on the label roll, the edges of the paper tape are always in an intended axial position when the paper tape is unrolled. The tensioned paper tape is thus not distorted along the paper path.

Most of the known label rolls are rolled up such that the edges of the individual paper layers of the label roll are located precisely one on top of the other. The sides of the label roll are in alignment along its diameter.

In the food sector, however, more and more “F-wrap” or “C-wrap” packaging is being used. These types of packaging are labeled using a label that is not located on just one side of the packaging but either wraps around the entirety of the packaging (F-wrap) or is affixed on three sides of the packaging (C-wrap). In both of these types of packaging, the label to be applied has an oblong shape, i.e., the extent of the label in one direction is much greater, for example four to eight times greater, than the extent of the label in the direction perpendicular thereto. If the roll width of a label roll having F-wrap or C-wrap labels corresponds to the length of the label, then significantly more labels can be wound on for the same roll diameter than when the roll width corresponds to the short side of the label. A label roll of this kind has a roll width between, for example, 30 cm and 50 cm. For production reasons, label rolls, in particular rolls of linerless labels without any backing paper, of this width often cannot be rolled up such that the edges of the individual paper layers of the paper tape are in alignment. Instead, these label rolls often have an S-shaped profile at their sides, as a result of which the side edges of the paper tape cannot automatically be axially aligned over the entire paper length when the roll core is aligned axially on the roll holder. When a roll core is fixed in the axial direction, the side edges of the paper tape then move back and forth in the axial direction during the unrolling process of the paper tape. For a defined paper path, this axial movement of the paper tape leads to distortion of the paper tape along the paper path and, in the worst-case scenario, to malfunctions of the label printer.

A device may have a paper sensor that detects an edge of the unrolled portion of the paper tape, and on the basis of the current position of the edge of the paper tape, or the direction in which the edge of the paper tape is currently moving, the axial position of the roll holder, and thus the axial position of the roll core, may be controlled by means of a motor such that the axial displacement of the paper tape on the label roll is compensated for. The paper tape is securely led through the paper path, with no distortion of the paper. However, roll mounting of this kind is complex and expensive.

SUMMARY

In an embodiment, the present disclosure provides a roll holder that is for a label roll of linerless labels wound in a crosswise manner. The roll holder has: a horizontally arranged spindle, which is held by a stand on at least one side, and a rotatable roll mount, which is oriented in parallel with the spindle, and which is mounted on the spindle. The roll mount is mounted on the spindle in a linearly displaceable manner using at least one linear bearing.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
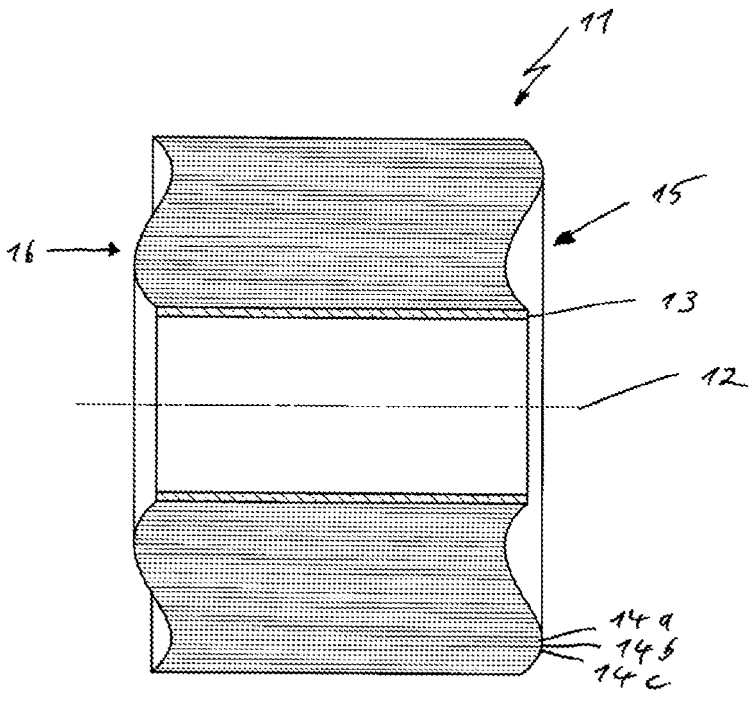
FIG. 1 is a sectional drawing of a label roll.

Aspects of the present disclosure provide a more cost-effective solution that requires less maintenance as compared to the prior art.

According to an aspect of the present disclosure, a roll holder for a label roll is provided. The label roll is in particular a roll of linerless labels, i.e. a label roll without any backing paper. In particular, the label roll is rolled up crosswise. For a person skilled in the art, this means a paper tape that is composed of a plurality of labels affixed next to one another, a so-called “continuous tape”, the labels being positioned next to one another with their long sides in the unrolling direction of the label roll such that the short side of each label corresponds to the longitudinal direction of the paper tape. The paper tape is designed for individual labels to be detached from the paper tape using a cutting unit, to be optionally printed on by a label printer before or after the detaching, and then to be applied to packaging, in particular as an F-wrap or C-wrap label, by a corresponding device. In one embodiment, the width of the label roll, and thus the long side of a label, is between 150 mm and 500 mm. In one embodiment, the short side of the label is between 50 mm and 150 mm in length. In one embodiment, the paper tape wound on the label roll is several hundred meters in length.

The roll holder may have a horizontally arranged spindle, which is held by a stand on at least one side. In one embodiment, the horizontally arranged spindle is held by a stand on one side whereas the other side of the spindle is freely suspended and thus not supported.

The roll holder may further have a rotatable roll mount, which is oriented in parallel with the spindle and mounted on the spindle. The roll mount is mounted on the spindle using at least one linear bearing and is linearly displaceable on the spindle by means of the at least one linear bearing. In one embodiment, two linear bearings are present which allow the roll mount to be displaceable on the spindle, the two linear bearings in particular being attached to the axial end regions of the roll mount.

For a person skilled in the art, a linear bearing in this context is a bearing that allows the roll mount to be displaced on the spindle in both axial directions, i.e., to be displaced back and forth on the spindle. The term "linear bearing" does not include any information as to whether the bearing permits or blocks rotation of the roll mount on the spindle.

The advantage of this is that a label roll held at a defined position on the roll mount is linearly displaceable in relation to the spindle. In a label roll of which the paper layers have an S-shaped profile in relation to the roll core, and in which the individual paper layers thus exhibit axial displacement in relation to the roll core, this displacement can be compensated for by the roll mount being displaced in the opposite direction so as to prevent the paper tape from being distorted in the paper path. This is particularly advantageous for wide label rolls. Since the paper tape is tensioned in the paper path and the linear bearing allows for smooth displacement between the spindle and the roll holder in the axial direction, the paper tension adjusts the roll holder to the corresponding axial position of the paper web if the paper edges are guided or held at a defined position in the paper path. A sensor for detecting the current paper position in the axial direction and a control unit comprising a motor-driven adjustment unit for axially moving the roll holder can be omitted.

In one embodiment, the linear bearing is a plain bearing.

In one embodiment, the linear bearing is a linear ball bearing, in particular a self-aligning linear ball bearing. A linear ball bearing allows the roll holder to be linearly displaced on the spindle with little frictional resistance. This is advantageous since the roll holder is linearly displaced on the spindle of the roll holder by the paper tension of the paper tape in the paper path. Smooth linear displacement of the roll holder assists the functioning of the mechanism. A self-aligning linear ball bearing is necessary when the spindle is slightly warped as a result of the weight of the label roll. Since the label rolls weigh several tens of kilograms, in particular more than 25 kg, slight warping always occurs, in particular in a spindle that is freely suspended at one end, which warping is compensated for by a self-aligning linear bearing. In addition to the bending of the spindle, the self-aligning linear bearing also compensates for alignment errors in the housing bores or the mounting of the spindle in the housing.

In one embodiment, the spindle is non-rotatably connected to the stand. The roll mount is rotatably mounted on the spindle. In particular, the at least one linear bearing is a linear ball bearing that enables both an axial movement and a rotational movement of the roll mount on the spindle. The axial mobility of the roll mount on the spindle owing to the linear ball bearing compensates for the offset of the individual paper layers on the label roll transversely to the unrolling direction. The linear ball bearing also allows the roll mount to rotate on the spindle in order to unroll the paper tape from the label roll.

In one embodiment, the spindle is rotatably held by the stand. The roll mount is connected to the spindle for conjoint rotation and in a linearly movable manner. In one embodiment, the roll mount is connected to the spindle for conjoint rotation by means of a driver, and the driver transmits a rotation of the roll mount to the spindle. In one embodiment, the linear bearing is a linear ball bearing in the embodiment comprising a driver. The driver prevents the roll mount from rotating on the spindle, but this rotational movement would in principle be enabled by the linear ball bearing. However, the advantage of the linear ball bearing, in particular a self-aligning linear ball bearing, is that tolerances are compensated for. Using a linear ball bearing is thus also advantageous in this embodiment.

In one embodiment, the driver consists of a bushing having a slot in the axial direction. The bushing is connected to the spindle for conjoint rotation. This should also be understood to mean that the bushing and the spindle are not interconnected directly but rather by means of an intermediate element. The technical effect is that a rotational movement caused at the bushing also causes a rotational movement of the spindle. A pin connected to the roll mount engages in the slot in the driver. The advantage of this is that a rotational movement of the roll mount is transmitted to the bushing by means of the pin. Since the bushing and spindle are connected for conjoint rotation, the rotational movement is transmitted to the spindle. If the label roll located on the roll mount is unrolled by a force being exerted on the paper tape in the direction of the paper path, a rotational movement is produced in the roll mount and leads to a rotational movement of the spindle. At the same time, owing to the configuration of the bushing having a slot in the axial direction, and to the connection for conjoint rotation between the roll mount and the bushing, a driver is created by the pin that engages in the slot, the driver being displaceable in the direction of the slot, i.e., in the axial direction. This allows the roll mount to be displaced on the spindle in the axial direction and simultaneously allows the roll mount and the spindle to be connected for conjoint rotation.

In one embodiment, either the bushing of the driver or the spindle is connected to a brake disk for conjoint rotation. The brake disk is connected by means of a tape to a deflection roll located in the paper path. In one embodiment, the tape is guided around the brake disk such that the brake disk rotates in a loop formed by the tape. When the tape is tensioned by the end of the tape being pulled in a direction away from the brake disk, the tape exerts a frictional force on the brake disk and brakes the brake disk. In one embodiment, one end of the tape is secured in a fixed position. The other end of the tape is secured to a movable retainer for a deflection roll of the paper path. If the tension of the paper tape in the paper path decreases, the retainer moves and the end of the tape moves, which thus exerts a braking force on the brake disk. In one embodiment, the tape is made of an extensible material. In one embodiment, the tape is made of a flexible but non-extensible material, in particular made of sheet metal, in particular sheet steel, in particular sheet steel having a thickness between 0.15 mm and 0.45 mm, in particular 0.3 mm.

In one embodiment, the roll holder consists of a main body, in particular of a tubular main body. At least one rail, in particular three rails, each open in the radial direction, is/are attached to the main body. The main body is mounted on the spindle in a linearly movable manner by means of the at least one linear bearing. The at least one rail guides a clamping element, in particular a clamping plate, that is at least radially movable. In one embodiment, a clamping plate is guided in each rail in a radially and axially movable manner.

In one embodiment, the roll holder has an operating lever on its axial end. The operating lever can be transferred from a working position into an installation position by means of an eccentric. In the context of this disclosure, an eccentric should be construed as an element that can rotate about a center of rotation in which the distance between the center of rotation and an edge of the element, measured in the horizontal plane, changes when the element is rotated.

In one embodiment, when in the installation position, the operating lever projects from the roll holder in the extension toward the spindle of the roll holder; in other words, in its longitudinal direction, the operating lever is oriented in the axial direction of the spindle. The at least one clamping plate is shifted in the radial direction by way of the eccentric as a result of the operating lever being moved from the installation position into the working position.

In one embodiment, the at least one clamping plate comprises a link running on a pin in the at least one rail of the main body. The link is arranged such that movement of the clamping plate in an axial direction of the main body leads to the clamping plate being displaced radially outward, and such that movement of the clamping plate in the other axial direction of the main body leads to the clamping plate being displaced radially inward. In one embodiment, the eccentric and the clamping plate interact such that movement of the operating lever from the installation position into the working position leads to the clamping plate being displaced in the axial direction, this displacement guiding the clamping plate outward in the radial direction by means of the link. The eccentric and the clamping plate interact such that movement of the operating lever from a working position into an installation position leads to the clamping plate being displaced in the axial direction, this displacement guiding the clamping plate inward in the radial direction by means of the link.

In one embodiment, an adjustment element is coupled to the operating lever. Rotating the operating lever in or counter to the direction of rotation of the main body causes the at least one clamping plate to be moved in the axial direction of the main body. In one embodiment, the adjustment element is interlocked with the operating lever in the direction of rotation of the main body such that rotation of the operating lever causes rotation of the adjustment element. By rotating the adjustment element, the gap between the main body and the adjustment element is altered. The adjustment element further comprises a driver for the at least one clamping plate, by which driver the clamping plate is displaced in the axial direction together with the adjustment element.

In one embodiment, the roll holder, in particular the main body, comprises a latching device for locking the roll mount in a middle position along a displacement path of the roll mount on the spindle. In this case, the middle position should not be designed such that the roll mount has to have the exact same travel path in both axial directions away from the middle position. Rather, the middle position should be construed to mean that the locking takes place substantially in the middle of the travel path such that movement in both axial directions is possible once the locking has been lifted. The locking does not lock the roll mount in an axial end position.

According to an aspect of the present disclosure, a label printer for printing on a paper tape wound on a label roll is provided. The label printer comprises a roll holder for the label roll and at least one print head for printing on the paper tape. The label printer has a paper path, which extends from the roll holder to the print head in the movement direction of the paper tape. In one embodiment, the paper tape is separated into individual labels between the roll holder and the print head by a cutting instrument. In this case too, the paper path should be understood as the movement direction from the roll holder to the print head. Along the paper path, the label printer comprises a deflection roll, along which the paper tape is guided. The effect of the deflection roll is that the paper path changes its direction on the deflection roll and the deflection roll guides the paper tape accordingly. The label printer comprises a roll holder in one of the above-described embodiments.

In one embodiment, the deflection roll comprises a paper-guiding device. On each side of the paper tape the paper-guiding device comprises a guide element, the guide elements being shiftable and securable in the axial direction of the deflection roll. In one embodiment, the guide elements can be shifted in a motor-driven manner. In one embodiment, the guide elements can be shifted manually. In one embodiment, the guide elements are coupled together so that when one guide element is shifted in one direction, the other guide element is shifted in the opposite direction. The guide elements form a guide for the edges of the paper tape. Since the paper tape is tensioned on the deflection roll, the axial position of the paper tape on the deflection roll is defined by way of the guide elements. The axial position of the roll holder accordingly trails said position such that the paper tape is guided between the paper roll and the deflection roll without being distorted, regardless of whether the uppermost paper layer is offset from the roll core.

In one embodiment, in its axial direction, the deflection roll comprises markings which indicate positions for arranging the guide elements on the deflection roll. The markings are related to the position of the at least one print head and/or to the paper width of the label roll. The advantage of this is that the markings show the operator the guide-element positions to which the guide elements have to be adjusted for a particular paper width in order to feed the paper tape to the print head at the correct position for printing in an intended field.

In one embodiment, the label printer comprises a control device comprising an input device. The control device receives at least one paper width of a label roll from the input device. The control device comprises a processor which determines, from the received paper width, axial positions of the guide elements on the deflection roll. In one embodiment, the axial positions of the guide elements on the deflection roll are displayed on a display unit. In one embodiment, the processor actuates a shifting unit, which moves the guide elements to the determined axial positions on the deflection roll in a motor-driven manner.

In one embodiment, the deflection roll is held by a pivotable arm. Pivoting the arm changes the position of the deflection roll and thus of the paper path. The arm is preloaded by a spring and the spring pulls the arm in a direction in which the route between the roll holder and the print head along the paper path becomes longer. The tension of the paper tape pulls the arm in a direction in which the route between the roll holder and the print head along the paper path becomes shorter. The arm is pulled counter to the spring force by the tension of the paper tape or by tensioning the paper tape. The effect of this is that, when the paper tape is being transported, for example by a transportation roller, the paper is tensioned and pulls the deflection roll in a direction in which the paper path becomes shorter. This allows the paper tape to be accelerated quickly and abruptly. The spring force pulls the arm in the opposite direction. Particularly when the paper tape is not being transported, the spring force outweighs the tension of the paper tape and the arm is pulled in a direction in which the paper path becomes longer.

To explain this, it is noted that the expression "route from the deflection roll to the print head" is for illustration purposes. Since the paper roll diameter decreases over the printing period and it is always the uppermost paper layer of a paper roll that is unwound, the precise paper guidance changes depending on the diameter of the paper roll. However, a person skilled in the art of label printers is very familiar with how to interpret the expression "paper path". In one embodiment, the deflection roll defines a deflection point for the paper tape in the paper path. The paper tape runs over the deflection roll by its flat side. In one embodiment, the paper tape runs over the deflection roll by its non-adhesive side. In one embodiment, the paper tape runs over the deflection roll by its adhesive side, the deflection roll being provided with an anti-stick coating. In one embodiment, the adhesive side of the paper tape comprises a plurality of longitudinal stripes of adhesive material, the longitudinal stripes being narrow compared with the width of the paper tape. In one embodiment, the longitudinal stripes of adhesive material are broken at the points at which the paper tape is intended for detaching individual labels.

In one embodiment, the label printer comprises an actuator, in particular a pneumatic cylinder. The actuator moves the arm into an installation position counter to the spring force. In the installation position, the route between the roll holder and the print head along the paper path is short. That is, the actuator pushes the arm counter to the spring force, which, as described above, tensions the paper tape. In other words, the actuator pushes the arm into a position in which the tension of the paper tape (where a paper tape is inserted in the paper path) is relieved. The actuator is triggered by the control device of the label printer. In one embodiment, the control device of the label printer triggers the actuator when a sensor detects that the hood of the label printer has been opened or when the control device receives a signal from the input device indicating that the label roll should be changed. The effect of this is that the actuator moves the arm and the deflection roll into a position in which, once a new label roll has been mounted on the roll holder, the paper tape can be inserted into the paper path from the roll holder to the print head. In particular, when the actuator is moved by a further actuator, a gap is produced between a print roller and the print head, or between a transportation roller and a counter-support to the transportation roller, such that the end of the paper tape can be introduced into the gap. If the transportation roller and counter-support, or the print roller and print head, and the arm are then moved back into the original position, the label printer is ready for operation again.

In one embodiment, the tape connected to the brake disk is fastened to the pivotable arm by one end. The tape runs at least over a portion of the circumference of the brake disk. In one embodiment, the tape runs in a loop or in a portion of a loop around the brake disk. The tape is tensioned around the brake disk when the pivotable arm moves along with the spring force, and the tape tension around the brake disk is relieved when the pivotable arm moves counter to the spring force. The effect of this is that the brake disk, and thus the roll holder together with the label roll, is braked when the paper path becomes longer, i.e., when more paper is unwound from the roll than is processed by the print head. This prevents the paper roll from running on when the transportation of the paper tape is stopped.

In one embodiment, the roll holder, in particular the main body or in particular an end element on the main body, comprises a latching device for locking the roll mount in a middle position along a displacement path of the roll mount on the spindle. The roll holder is prevented from being linearly displaceable on the spindle by the latching device. This is advantageous for changing the paper roll since the operator need not take care not to move the roll mount into the end position of the axial displacement path when they push on the paper roll, in which case the label roll would be displaceable only in one axial direction. When the roll holder is locked in particular in the middle of the axial displacement path by the latching device and remains in this axial position when the paper roll is mounted, the roll holder can move in both axial directions during the printing operation once the latching device has been released. In one embodiment, the latching device is triggered when the sensor for the hood detects that the hood has been opened. In one embodiment, the latching device is coupled to the actuator, in particular to the pneumatic cylinder of the arm. In one embodiment, the latching device consists of a movable retaining plate that engages in a slot in the roll holder.

A number of embodiments of the present disclosure are shown by way of example in the drawings and described hereinafter.

FIG. 1 is a sectional drawing through a label roll 11. The drawing serves to illustrate the effect whereby the individual paper layers 14*a*, 14*b*, 14*c* are not rolled up in a planar manner vertically in relation to one another at the edges. This effect is particularly pronounced when the label rolls 11 are wound crosswise and are thus very wide, as used for example for F-wrap labeling. A label roll 11 of this kind is up to 50 cm wide, for example. The label roll 11 is wound around a roll core 13. The center of the roll core 13 defines the axis 12 of the label roll 13 about which the continuous tape of the label roll 11 is unwound. The individual paper layers 14*a*, 14*b*, 14*c* of the continuous tape are continuously wound on the label roll 11. Owing to the production process, the individual paper layers 14*a*, 14*b*, 14*c* are displaced horizontally such that bulges 16 and indentations 15 are produced on the left-hand and right-hand vertical edges of the label roll 11. In other words, the individual paper layers 14*a*, 14*b*, 14*c* can be displaced horizontally with respect to one another. Since it is always the uppermost paper layer that is unwound, the paper tape is vertically displaced when the paper tape is unwound from the label roll 11.

Figure 2A:
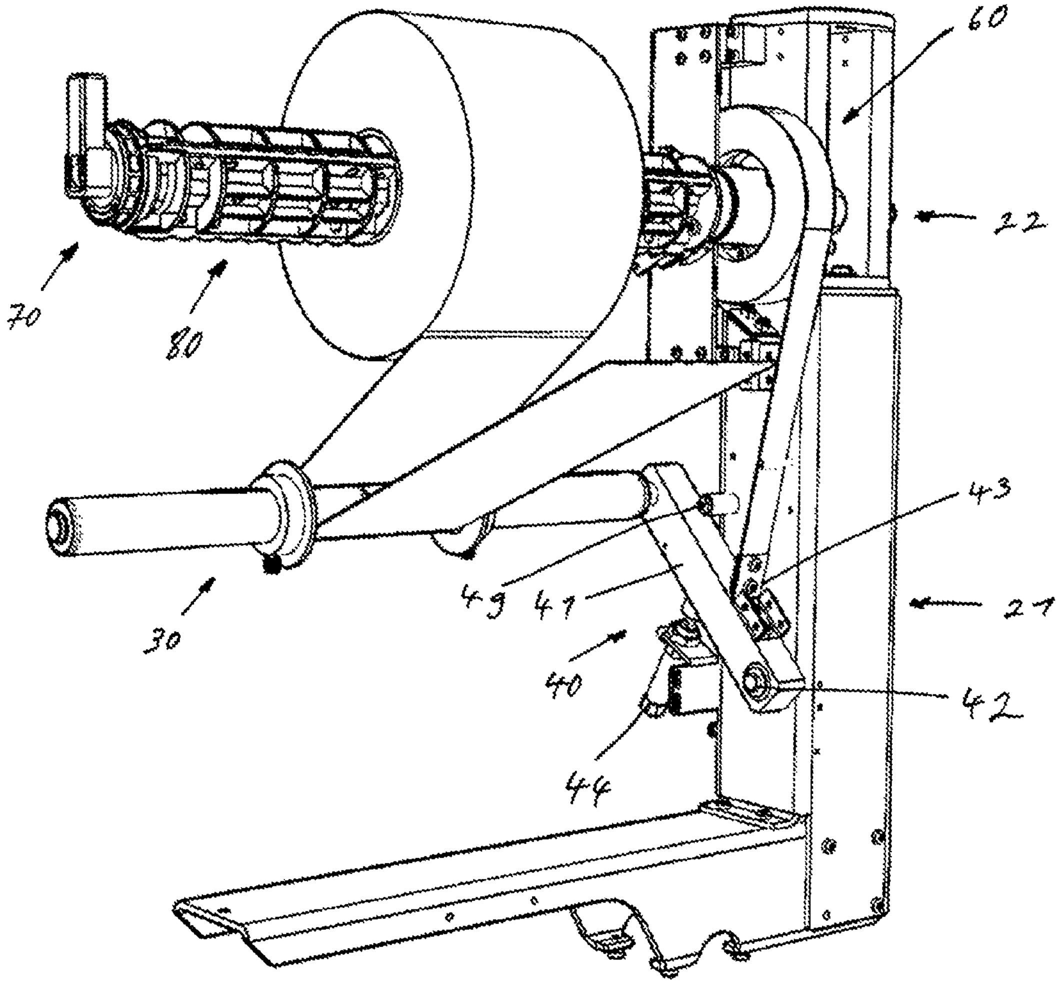
FIG. 2*a* is a first view of a roll holder for a label printer.
Figure 2B:
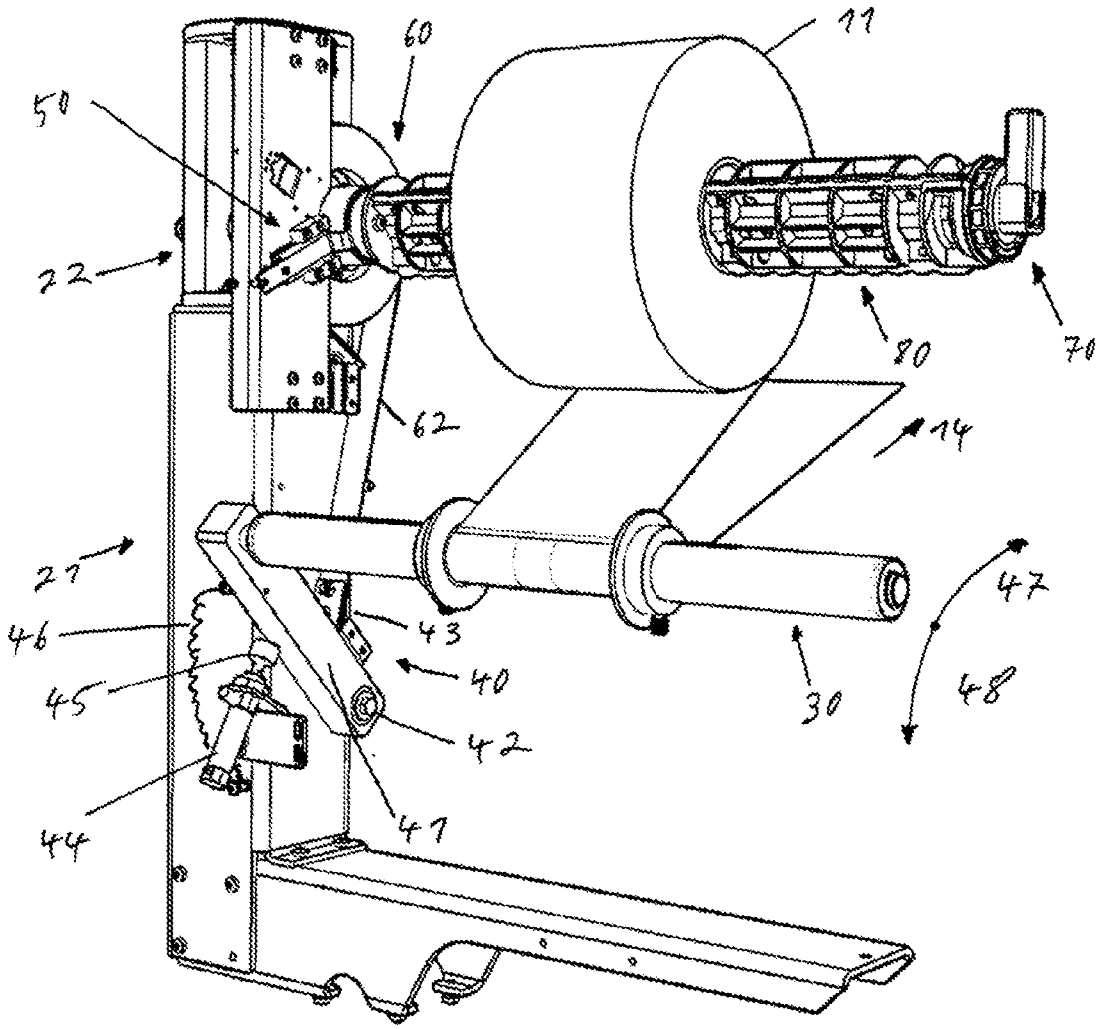
FIG. 2*b* is a second view of a roll holder for a label printer.

FIGS. 2*a* and 2*b* are two different views of a roll holder of a label printer for a label roll 11. The roll holder comprises a stand which is attached to a labeler, for example an F-wrap labeler. The stand comprises a vertical support 21, which is extended by a bracket 22 for a roll mount 80. The roll mount 80 is rotatably fastened to the bracket 22 by means of ball bearings. The roll holder further comprises a clamping device 70 and a driver device 60. The roll holder comprises a latching device 50 for locking the roll mount 80 in an axial position. The roll holder further comprises a deflection roll

30, which is pivotably fastened by means of a pivot device 40 and defines the paper tape. The pivot apparatus 40 comprises a pivotable arm 41, which is fastened so as to be pivotable about a center of rotation 42. The deflection roll 30 is rotatably fastened to the pivotable arm 41. The pivotable arm 41 is pulled, by way of the spring force of a spring 46, in a direction 48 in which the paper path, defined by the deflection roll 30, between the label roll 11 and the print head becomes longer. A ram 45 of a pneumatic cylinder 44 moves the pivotable arm 41, when the pneumatic cylinder 45 is extended, in an opposite direction 47 in which the paper path, defined by the deflection roll 30, between the label roll 11 and the print head becomes shorter. This movement is limited by a stop 49 for the pivotable arm. A flexible steel tape 62, which is guided over a brake disk, is fastened to the pivotable arm 41, in particular close to the center of rotation 42, by a fastening mechanism 43.

Figure 3:
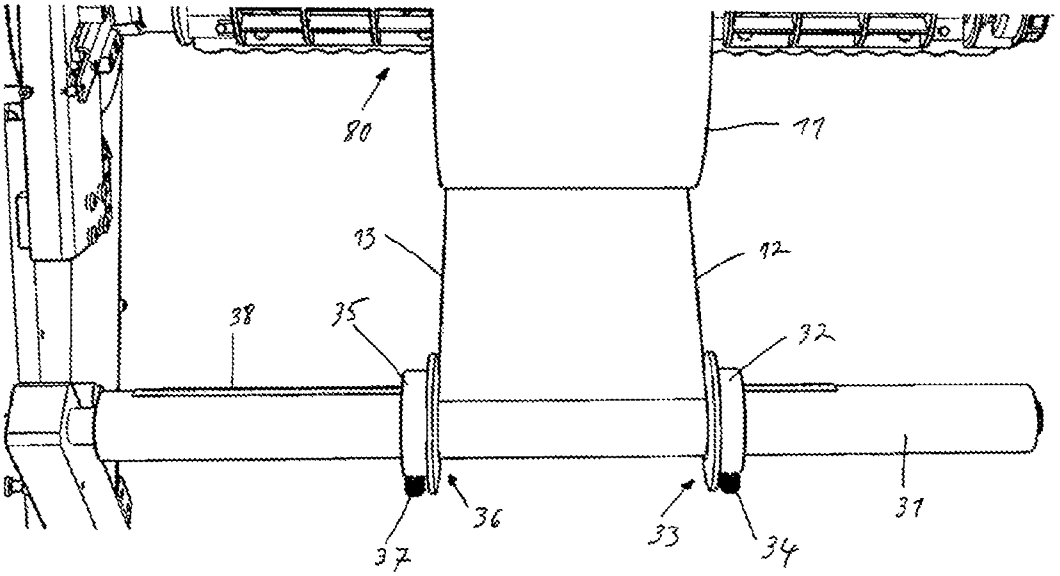
FIG. 3 shows a deflection roll.

FIG. 3 shows the deflection roll 30 for the paper tape. The paper tape unwound from the label roll 11 loops around a rotatable roll 31 of the deflection roll 30. The paper tape comprises a first side edge 12 and a second side edge 13. To guide the paper tape in a defined manner in the paper path perpendicularly to the movement direction of the paper tape in relation to its position on the deflection roll 30, the deflection roll 30 comprises a paper-guiding device. A first guide element 32, which is movable in the axial direction, is attached to the rotatable roll 31 and can be secured at an axial position on the rotatable roll 31 by a first fastener 34. In addition, a second guide element 35, which is movable in the axial direction, is attached to the rotatable roll 31 and can be secured at an axial position on the rotatable roll 31 by a second fastener 37. The side edges 12, 13 of the paper tape slide along the inner sides 33, 36 of the relevant guide element 32, 35. If the guide elements 32, 35 are secured in the axial direction such that the gap between the inner sides 33, 36 of the guide elements 32, 35 corresponds to the width of the paper tape, or possibly to the width of the paper tape including a slight tolerance, then owing to the paper tension the paper tape loops around the rotatable roll 31 in close abutment therewith and is guided in a defined manner. In its axial direction, the rotatable roll 31 further comprises markings 38 which indicate positions for arranging the guide elements on the deflection roll. The markings 38 are related to the position of the at least one print head and/or to the paper width of the label roll. In other words, the markings 38 show an operator the position in the axial direction at which they have to secure the guide elements 32, 35 for a particular paper roll 11 having a defined width and for a predetermined printing field.

Figure 4:
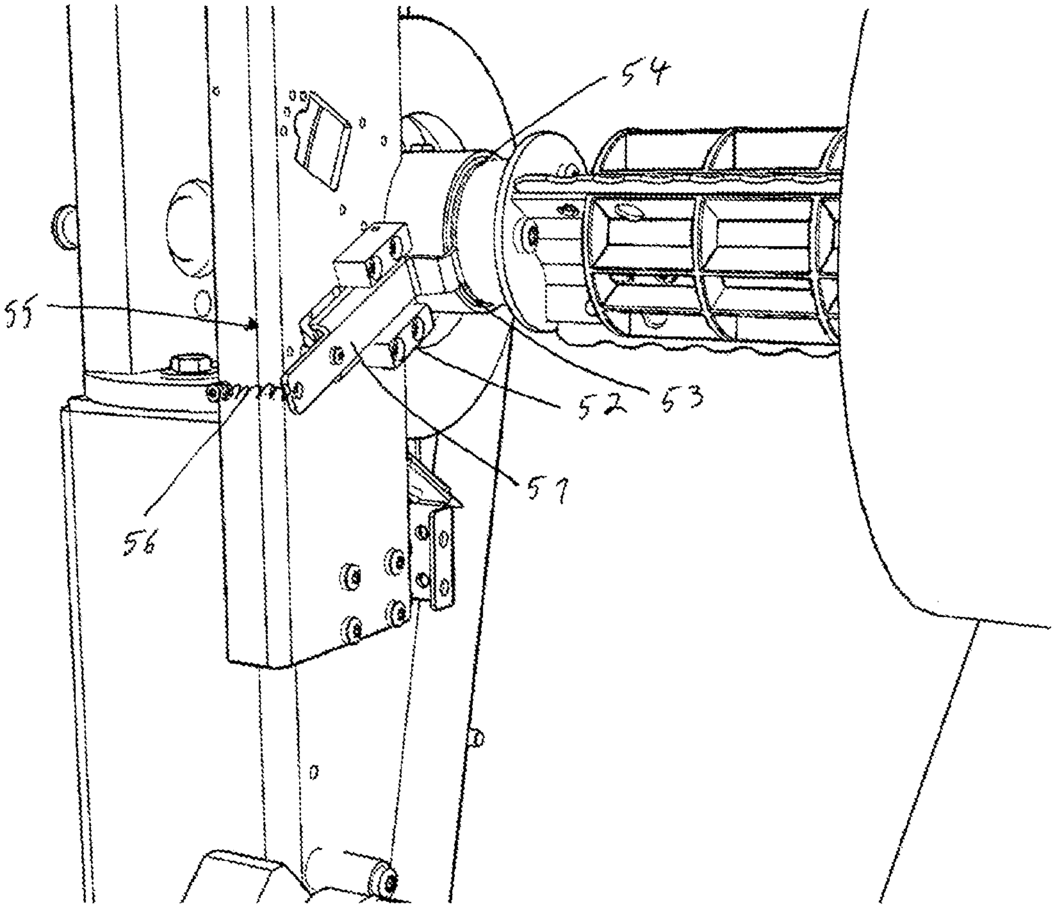
FIG. 4 shows a latching device for a roll holder.

FIG. 4 shows a latching device 50 for a roll holder for locking the roll mount 80 in a middle position along the axial displacement path of the roll mount. The latching device 50 consists of a movable retaining plate 51, which engages by one end 53 in a slot 54 in the roll holder 80, in particular in a slot 54 in an end element 64 of the roll holder 80. The latching device 50 comprises a latching guide 52, which is rigidly connected to the bracket 22 of the vertical support 21. The retaining plate 51 is linearly movable in the latching guide 52. The retaining plate 51 is moved into the locked position in the direction of the roll mount by a pneumatic cylinder 55. In FIG. 4, the pneumatic cylinder 55 is concealed. When the pneumatic cylinder 55 is vented, the retaining plate 51 is pulled by a spring 56 into a releasing position in which the retaining plate 51 no longer engages in the slot 54 by its end 53.

Figure 5A:
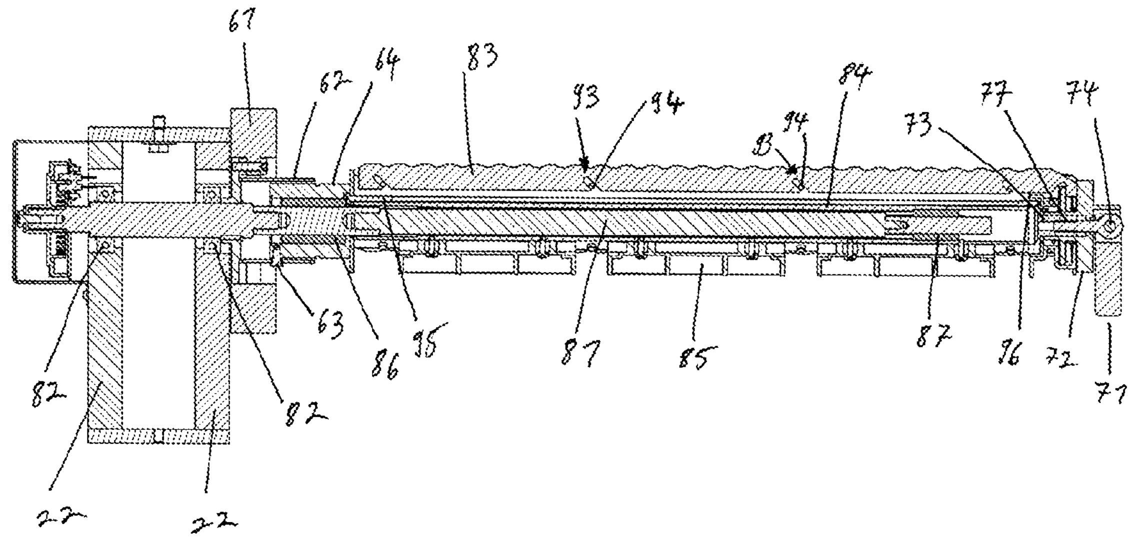
FIG. 5*a* is a sectional drawing of a roll holder.
Figure 5B:
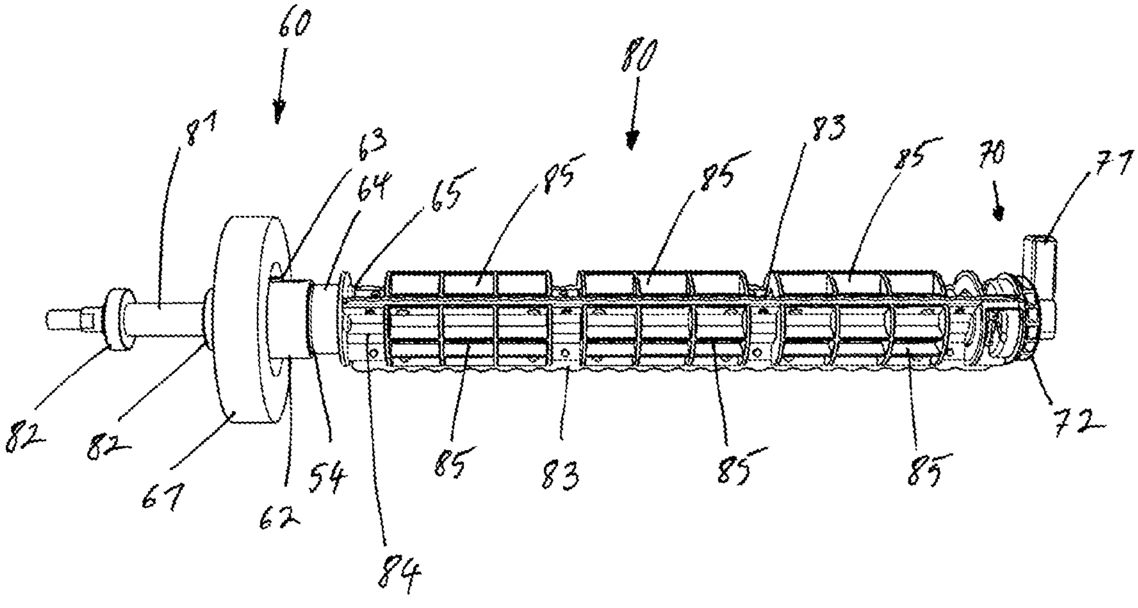
FIG. 5*b* shows a roll holder.
Figure 6A:
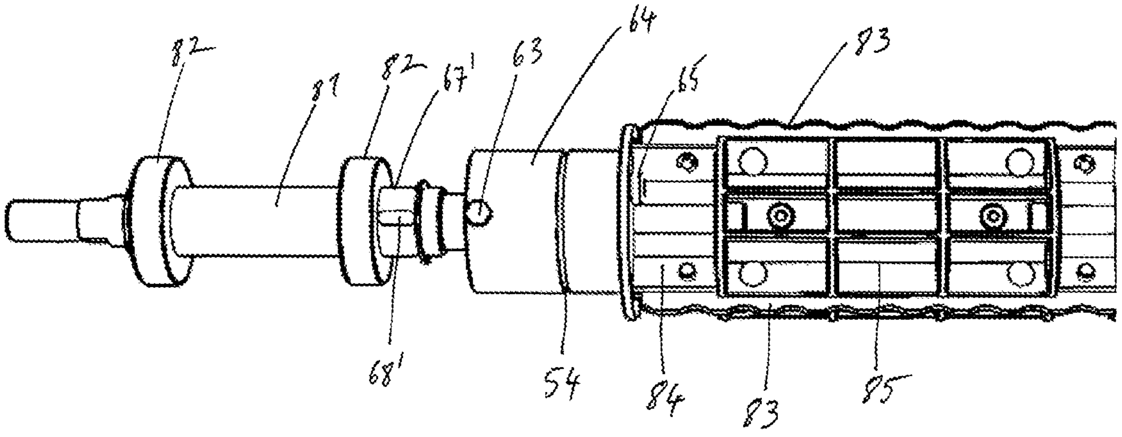
FIG. 6*a* shows a driver of a roll holder.
Figure 7:
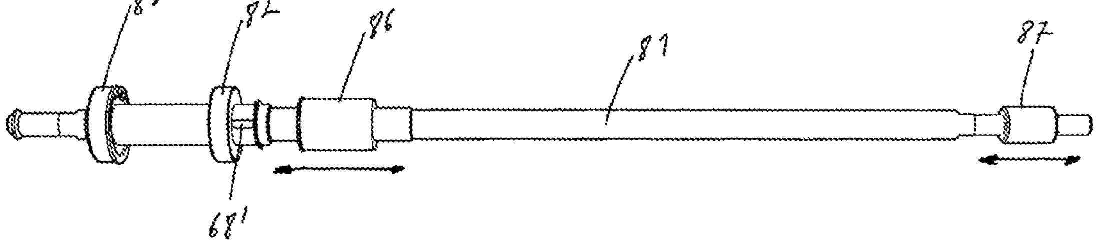
FIG. 7 shows a spindle of a roll holder.
Figure 8A:
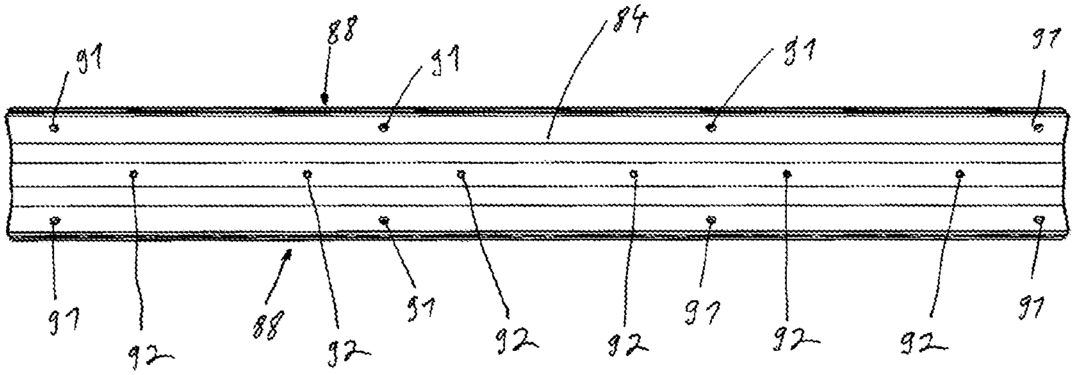
FIG. 8*a* is a first view of a roll mount of a roll holder.

FIGS. 5*a* and 5*b* show a roll holder for a label printer. FIG. 5*a* is a sectional drawing of the roll holder. FIG. 5*b* is a plan view of the roll holder. The roll holder is rotatably fastened in a bracket 22 by its horizontal spindle 81 by means of ball bearings 82. The bracket 22 extends a vertical support of the label printer in the vertical direction. The spindle 81 will be described below in relation to FIG. 7. FIGS. 5*a* and 5*b* show the driver device 60 of the roll holder, which driver device will be described below in relation to FIGS. 6*a* and 6*b*. FIGS. 5*a* and 5*b* likewise show the clamping device 70, which will be described below in relation to FIGS. 9*a*, 9*b* and 9*c*. As shown in FIGS. 5*a* and 5*b*, the roll holder comprises a roll mount 80. The roll mount 80 consists of a main body 84 (see also FIGS. 8*a* and 8*b*), which is mounted on the spindle 81 in a linearly displaceable manner by means of self-aligning linear ball bearings 86, 87. The travel path of the linear ball bearings 86, 87 on the spindle 81 is not limited by stops on the spindle 81 since this travel path is limited by the driver device 60. The main body 84 of the roll mount 80 is formed as an elongate tube 89 which is mounted on the spindle 81 by means of the linear ball bearings 86, 87. On the outside of the tube 89 there are three rails 88 that extend in the axial direction and are open in the radial direction. In each of the rails 88 there are clamping plates 83 that are movable in the axial and radial directions, the clamping plates 83 having obliquely arranged links 93 that are movable by means of stationary pins 94. The pins 94 are held in bores 91 in the rails 88. The pins 94 thus form a rigid guide for the links 93 within the rails 88. When the clamping plates are moved axially in one axial direction, the clamping plates 83 are moved out of the rails 88 in the radial direction by means of the pins 94 and by means of the links 93. When the clamping plates are moved axially in the opposite axial direction, the clamping plates 83 are moved into the rails 88 in the radial direction by means of the pins 94 and by means of the links 93. Between the rails 88 there are arranged, on the outside of the main body 84, supporting elements 85 fastened in screw joints 92 of the main body 84. The supporting elements 85 form a round contour of the roll mount 80, broken up by the rails 88. The rails 88 have a smaller radial extent than the supporting elements 85. The supporting elements 85 thus form a roll mount on which the roll core is mounted. In the process, the diameter of the roll mount 80 formed by the supporting elements 85 is slightly smaller than the internal diameter of the roll core such that the label roll 11 can be pushed onto the roll mount 80 in a simple manner. The clamping plates 83 protrude out of the rails 88 and are radially displaceable. The radial displaceability of the clamping plates 83 extends from a region in which the outsides of the clamping plates 83 do not project radially beyond the supporting elements 85 as far as a region in which the outsides of the clamping plates 83 protrude radially beyond the supporting elements 85. As a result, the roll core can be clamped on the roll holder 80 by radially displacing the clamping plates 83.

Figure 6B:
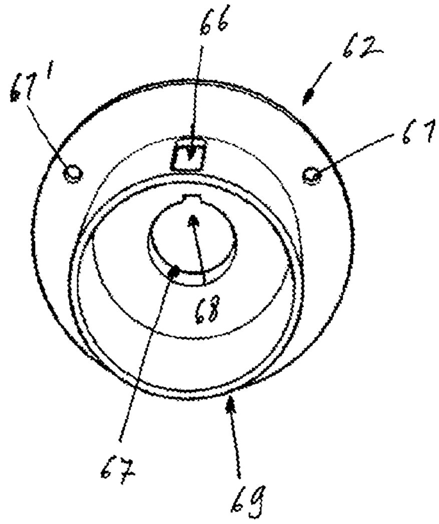
FIG. 6*b* shows a bushing for the driver of a roll holder.

The roll holder further comprises a driver device 60, which transmits to the spindle 81 a rotational movement of the roll mount 80 caused by the paper tape of the label roll 11 being unwound. As shown in FIG. 6*b*, the driver apparatus 60 comprises a bushing 62, in the inner region 69 of which the roll mount 80, in particular an end element 64 (FIG. 6*a*), which is screwed to the main body 84 of the roll mount 80 by screws 65, is attached in an axially movable manner. The end element 64 comprises a pin 63 which engages in an axial slot 66 in the bushing 62. The end element 64 can thus move axially in the bushing 62. However, the deflection of the axial movement is limited by the length of the slot 66. In this respect, the driver device 60 limits the travel path of the roll mount 80 on the spindle 81 of the roll holder in the axial direction. The bushing 62 is mounted on the spindle 81 for conjoint rotation. The connection for conjoint rotation is established in particular by means of a bore 67 in a wall of the bushing and an associated recess 68 in the bore 67. The bushing 62 is mounted on the spindle 81 by the bore 67 in a receiving region 67', the spindle comprising a lug 68' which engages in the recess 68 and forms the connection for conjoint rotation. In a side wall, the bushing 62 comprises bores 61' via which the bushing is connected to a brake disk 61. As shown, the brake disk 61 is braked by means of a flexible steel tape 62 when the pivotable arm 41 of the pivot apparatus 40 is moved by the spring force of the spring 46 in a direction in which the paper path is lengthened.

Figure 8B:
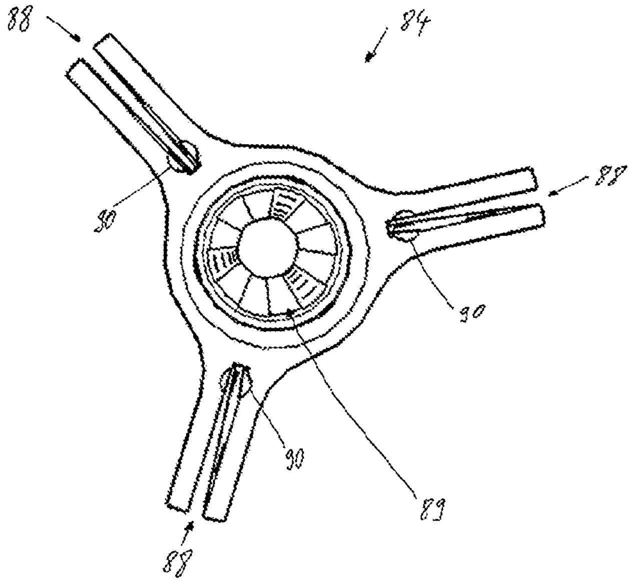
FIG. 8*b* is a second view of a roll mount of a roll holder.

FIG. 8*b* shows bores 90 that are provided in the axial direction in the main body 84 and in which a cylinder 73 of the clamping device 70 is fastened by screws. Equally, bores in which the end element 64 is screwed to the main body by screws are provided on the other side of the main body, which is at the rear in FIG. 8*b*.

Figure 9A:
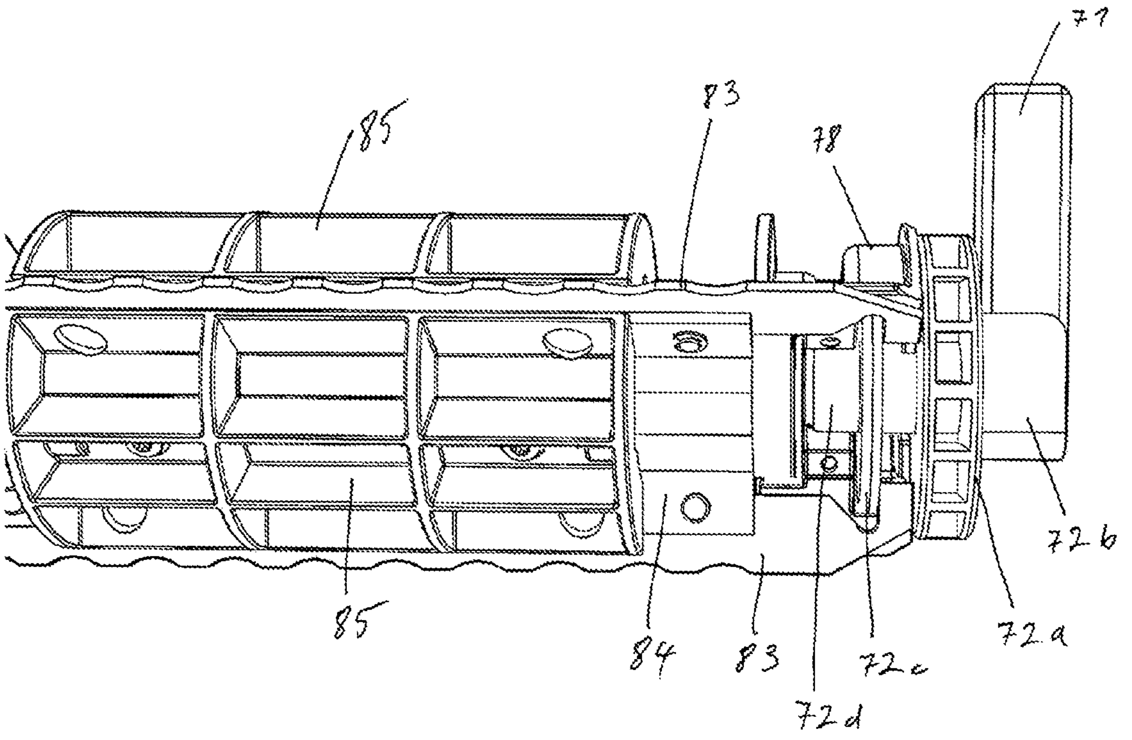
FIG. 9*a* is a first view of a clamping device of a roll holder.
Figure 9B:
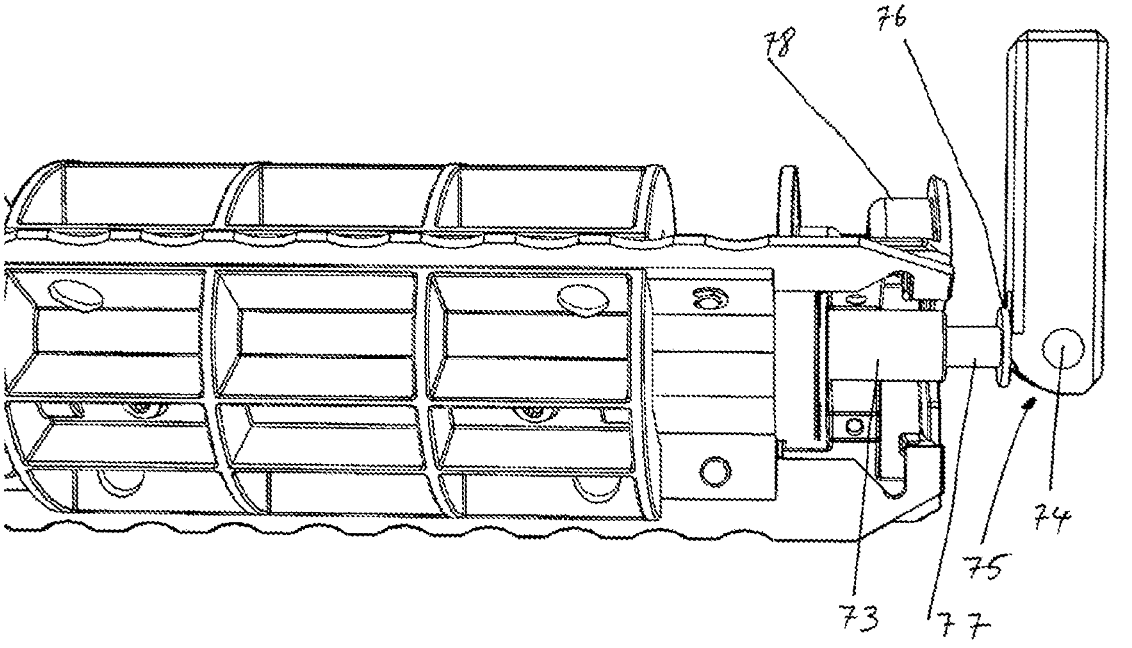
FIG. 9*b* is a second view of a clamping device of a roll holder.
Figure 9C:
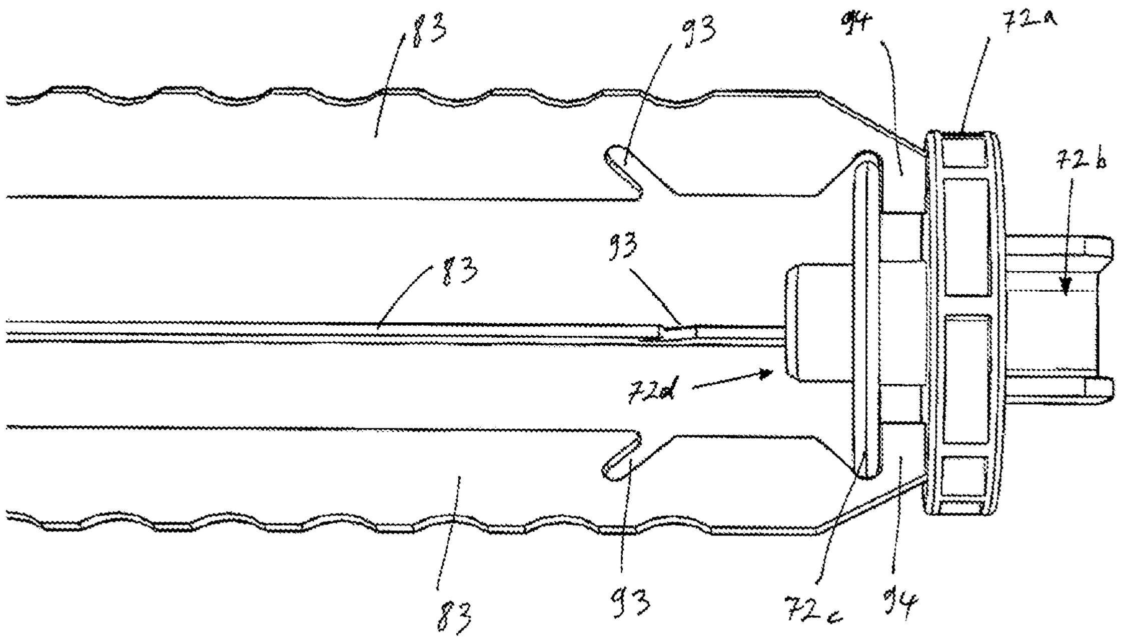
FIG. 9*c* shows clamping plates and an adjustment element of the clamping device.

The clamping device 70 is shown in FIGS. 9*a*, 9*b* and 9*c*. In principle, the function of the clamping device 70 is to displace the clamping plates 83 axially relative to the main body 84 into the slots 88 in the main body 84. By means of the links 93 in the clamping plates 83, and owing to the pins 94 rigidly connected to the main body 84, the radial position of the clamping plates 83 in relation to the center of the main body 84 depends on the axial position of the clamping plates 83 in the slots 88 in the main body 84. In other words, axially displacing the clamping plates 83 in the slots 88 in the main body 84 alters the diameter of a cylinder clamped by the outer edges of the clamping plates 83. This is caused by way of the clamping device 70.

In the process, two adjustment mechanisms are implemented by way of the clamping device 70 in order to adapt the radial position of the clamping plates 83 in the main body 84, both mechanisms being implemented with the interaction of an adjustment element 72. The first mechanism changes the position of the clamping plates by rotating the adjustment element 72, and serves to produce a basic setting. The second mechanism is brought about by transferring an operating lever 71 from a working position, in which the operating lever is perpendicular to the spindle 81, into an installation position, in which the operating lever is parallel to the spindle 81. This mechanism is used, once a label roll 11 has been mounted on the roll holder, to clamp the label roll by transferring the operating lever 71 from the installation position into the working position, i.e., to move the clamping plates 83 outward in the radial direction by means of said transferring of the operating lever 71.

In particular, the adjustment element 72 is formed in one piece and consists of a rotation element 72*a*, a retainer 72*b* for the operating lever 71, a driver disk 72*c*, and a bushing 72*d*. The bushing 72*d* forms the main body of the adjustment element 72 and is open on one side. The driver disk 72*c* is attached to the bushing 72*d*, and the rotation element 72*a* is attached to the axial end of the bushing 72*d* opposite the opening. In the axial direction between the driver disk 72*c* and the rotation element 72*a* there is a defined gap in which the clamping plates 83 engage by means of a coupling device 94. In this case, the coupling device 94 is formed as a hook that engages from the outside in the space between the driver disk 72*c* and the rotation element 72*a*, the hook being formed by a plate that has the width of the space between the driver disk 72*c* and the rotation element 72*a*. The plate is thus contacted by the driver disk 72*c* on one side and by the rotation element 72*a* on the other side. If the adjustment element 72 is displaced in the axial direction, the clamping plates 83 are also displaced in the axial direction by way of the coupling device 94. Since the driver disk 72*c* and the rotation element 72*a* are concentric in the region in which they come into contact with the coupling device 94, this effect is present regardless of the rotational position in which the adjustment element 72 is positioned.

The adjustment element 72 is attached to a cylinder 73 by the bushing 72*d*, the cylinder forming a slide surface for the bushing 72*d*. The cylinder 73 is rigidly connected to the main body 84. A screw 77 is screwed into an internal thread of the cylinder 73. The operating lever 71 is tiltably attached to the screw head 74. Rotating the screw 77 alters the gap between the cylinder 73 and the operating lever 71. The operating lever 71 is attached in the retainer 72*b* of the adjustment element 72 such as to be tiltable yet connected for conjoint rotation in the direction of rotation of the screw 77. Rotating the rotation element 72*a* thus leads to rotation of the operating lever 71 about the axial direction of the screw 77 and to the screw 77 being screwed into or unscrewed from the cylinder 73. The distance between the operating lever 71 and the cylinder 73 is thus reduced or enlarged. Therefore, rotating the rotation element 72*a* alters the gap between the main body 84 and the region between the driver disk 72*c* and the rotation element 72*a*, and the clamping plates 83 thus move into the slots 88 in the main body in the axial direction. By way of the link 93, this causes the radial position of the clamping plates 83 to be altered. Therefore, by rotating the adjustment element 72, the diameter of a cylinder clamped by the outer edges of the clamping plates 83 can be altered.

At its end at which it is tiltably connected to the screw head 74 of the screw 77, the operating lever 71 has an eccentric 75. A washer 76 abuts the eccentric on the screw 77. Said washer in turn abuts the adjustment element 72. If the operating lever 71 is moved from the installation position (in the extension of the spindle 81) into the working position (FIGS. 9*a* and 9*b*) by being rotated around the screw head 74 from the horizontal position into the vertical position, the washer 76 is displaced on the screw 77 toward the cylinder 73 by the eccentric 75. The adjustment element 72 is moved toward the main body 84. The clamping plates 83 are pushed radially outward. If the operating lever 71 is tilted from the working position into the installation position by being rotated around the screw head 74, a spring pushes the adjustment element 72 toward the operating lever 71 until the washer 76 abuts the eccentric. The gap between the adjustment element 72 and the main body 84 increases and the clamping plates 83 are retracted. Axially displacing the clamping plates 83 into the slots 88 in the main body 84 alters the diameter of a cylinder clamped by the outer edges of the clamping plates 83 and clamps or relieves the tension on the label roll 11 accordingly. The mechanism is housed by a cover 78.

The functions of various elements shown in the drawings, including the functional blocks, may be implemented by dedicated hardware or by generic hardware capable of executing software in conjunction with the corresponding software. If the functions are provided by means of a processor, they may be provided by a single dedicated processor, a single shared processor, or a plurality of generic processors which may in turn be shared. The functions may be provided, without limitation, by a digital signal processor (DSP), network processor, application-specific integrated circuit (ASIC), field programmable gate array (FPGA), read-only memory (ROM) with stored software, random access memory (RAM), and non-volatile memories.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A roll holder for a label roll of linerless labels wound in a crosswise manner, the roll holder comprising:

a horizontally arranged spindle, which is held by a stand on at least one side, and a rotatable roll mount, which is oriented in parallel with the spindle, and which is mounted on the spindle, wherein the roll mount is mounted on the spindle in a linearly displaceable manner using at least one linear bearing, and wherein the linear bearing is a plain bearing that is a self-aligning linear ball bearing.

2. The roll holder for the label roll according to claim 1, wherein the spindle is non-rotatably connected to the stand, and wherein the roll mount is rotatably mounted on the spindle, the at least one linear bearing being a linear ball bearing that is configured to enable both an axial movement and a rotational movement of the roll mount on the spindle.

3. The roll holder for the label roll according to claim 1, wherein the spindle is rotatably held by the stand, and the roll mount is connected to the spindle for conjoint rotation and in a linearly movable manner.

4. The roll holder for the label roll according to claim 3, wherein the roll mount is connected to the spindle for conjoint rotation by a driver, and the driver is configured to transmit a rotation of the roll mount to the spindle.

5. The roll holder for the label roll according to claim 4, wherein the driver comprises a bushing having a slot in an axial direction, and the bushing is connected to the spindle such that it is configured to provide conjoint rotation, and wherein a pin connected to the roll mount engages in the slot in the driver.

6. The roll holder for the label roll according to claim 1, wherein either a bushing of a driver or a spindle is connected such that it is configured to provide conjoint rotation to a brake disk, which is connected by a tape to a deflection roll located in a paper path.

7. The roll holder for the label roll according to claim 1, wherein the roll holder comprises a main body having at least one rail, the main body being mounted on the spindle in a linearly movable manner by the at least one linear bearing, and the at least one rail guiding a clamping plate, which is at least radially movable.

8. The roll holder for the label roll according to claim 7, wherein the roll holder has an operating lever on its axial end, the lever being configured to be transferred from a working position into an installation position by an eccentric, and, when in the installation position, the operating lever is configured to protrude from the roll holder in extension toward the spindle of the roll holder, and wherein the at least one clamping plate is configured to be shifted in a radial direction by the eccentric as a result of the operating lever being moved from the installation position into the working position.

9. The roll holder for the label roll according to claim 8, wherein the at least one clamping plate comprises a link running on a pin in the at least one rail of the main body, and the link is arranged such that movement of the clamping plate in an axial direction of the main body leads to the clamping plate being displaced radially outward and movement of the clamping plate in the other axial direction of the main body leads to the clamping plate being displaced radially inward.

10. The roll holder for the label roll according to claim 8, wherein an adjustment element is coupled to the operating lever, and rotating the operating lever in or counter to the direction of rotation is configured to cause the at least one clamping plate to be moved in the axial direction of the main body.

11. The roll holder for the label roll according to claim 1, wherein the roll holder comprises a latching device configured to lock the roll mount in a middle position along a displacement path of the roll mount on the spindle.

12. A label printer for printing on a paper tape wound on the label roll, the label printer comprising:

the roll holder for the label roll according to claim 1;

at least one print head for printing on the paper tape;

a paper path extending from the roll holder to the print head in a movement direction of the paper tape; and a deflection roll along the paper path, the paper tape being guided along the deflection roll.

13. The label printer according to claim 12 for printing on the paper tape wound on the label roll, wherein the deflection roll comprises a paper-guiding device, the paper-guiding device comprising guides on each side of the paper tape, the guides being shiftable and securable in an axial direction of the deflection roll.

14. The label printer according to claim 13 for printing on the paper tape wound on the label roll, wherein, in its axial direction, the deflection roll comprises markings which indicate positions for arranging the guides on the deflection roll, and the markings are related to the position of the at least one print head and/or to a paper width of the label roll.

15. The label printer according to claim 13 for printing on the paper tape wound on the label roll, wherein the label printer comprises a controller, the controller being configured to receive at least one paper width of the label roll from an input, and the controller having a processor that is configured to determine axial positions of the guides on the deflection roll from the received paper width and to display the axial positions of the guides on the deflection roll on a display or to actuate a shifting actuator that moves the guides to the determined axial positions on the deflection roll in a motor-driven manner.

16. The label printer according to claim 12 for printing on the paper tape wound on the label roll, wherein the deflection roll is held by a pivotable arm and a position of the deflection roll, and thus of the paper path, is altered by pivoting the arm, the arm being preloaded by a spring and the spring pulling the arm in a direction in which a route between the roll holder and the print head along the paper path becomes longer, and a tension of the paper tape pulling the arm in a direction in which the route between the roll holder and the print head along the paper path becomes shorter.

17. The label printer according to claim 16 for printing on the paper tape wound on the label roll, wherein the label printer comprises a controller; and an actuator, which is configured to move the arm counter to the spring force into an installation position in which the route between the roll holder and the print head along the paper path is short, the actuator being configured to be triggered by the controller of the label printer, and the controller of the label printer being configured to trigger the actuator when a sensor detects that a hood of the label printer has been opened or when the controller receives a signal indicating that the label roll should be changed.

18. The label printer according to claim 16 for printing on the paper tape wound on the label roll, wherein the tape connected to the brake disk is fastened to the pivotable arm by one end, and the tape runs at least over a portion of the circumference of a brake disk, and the tape is tensioned around the brake disk when the pivotable arm moves along with the spring force and the tape tension around the brake disk is relieved when the pivotable arm moves counter to the spring force.

19. A roll holder for a label roll of linerless labels wound in a crosswise manner, the roll holder comprising:

a horizontally arranged spindle, which is held by a stand on at least one side, and a rotatable roll mount, which is oriented in parallel with the spindle, and which is mounted on the spindle, wherein the roll mount is mounted on the spindle in a linearly displaceable manner using at least one linear bearing, and wherein the spindle is rotatably held by the stand, and the roll mount is connected to the spindle for conjoint rotation and in a linearly movable manner.

20. The roll holder for the label roll according to claim 19, wherein the roll mount is connected to the spindle for conjoint rotation by a driver, and the driver is configured to transmit a rotation of the roll mount to the spindle.

21. The roll holder for the label roll according to claim 20, wherein the driver comprises a bushing having a slot in the axial direction, and the bushing is connected to the spindle for conjoint rotation, and wherein a pin connected to the roll mount engages in the slot in the driver.

22. The roll holder for the label roll according to claim 19, wherein either a bushing of a driver or a spindle is connected for conjoint rotation to a brake disk, which is connected by a tape to a deflection roll located in a paper path.

23. A roll holder for a label roll of linerless labels wound in a crosswise manner, the roll holder comprising:

a horizontally arranged spindle, which is held by a stand on at least one side, and a rotatable roll mount, which is oriented in parallel with the spindle, and which is mounted on the spindle, wherein the roll mount is mounted on the spindle in a linearly displaceable manner using at least one linear bearing, and wherein either a bushing of a driver or a spindle is connected for conjoint rotation to a brake disk, which is connected by a tape to a deflection roll located in a paper path.

24. A roll holder for a label roll of linerless labels wound in a crosswise manner, the roll holder comprising:

a horizontally arranged spindle, which is held by a stand on at least one side, and a rotatable roll mount, which is oriented in parallel with the spindle, and which is mounted on the spindle, wherein the roll mount is mounted on the spindle in a linearly displaceable manner using at least one linear bearing, wherein the roll holder comprises a main body having at least one rail, the main body being mounted on the spindle in a linearly movable manner by the at least one linear bearing, and the at least one rail guiding a clamping plate, which is at least radially movable, wherein the roll holder has an operating lever on its axial end, the lever being configured to be transferred from a working position into an installation position by an eccentric, and, when in the installation position, the operating lever is configured to protrude from the roll holder in extension toward the spindle of the roll holder, and wherein the at least one clamping plate is configured to be shifted in the radial direction by the eccentric as a result of the operating lever being moved from the installation position into the working position.

25. The roll holder for the label roll according to claim 24, wherein the at least one clamping plate comprises a link running on a pin in the at least one rail of the main body, and the link is arranged such that movement of the clamping plate in an axial direction of the main body leads to the clamping plate being displaced radially outward and movement of the clamping plate in the other axial direction of the main body leads to the clamping plate being displaced radially inward.

26. The roll holder for the label roll according to claim 24, wherein an adjustment element is coupled to the operating lever, and rotating the operating lever in or counter to the direction of rotation is configured to cause the at least one clamping plate to be moved in the axial direction of the main body.

27. The roll holder for the label roll according to claim 24, wherein the roll holder comprises a latching device configured to lock the roll mount in a middle position along a displacement path of the roll mount on the spindle.

* * * * *